Feb. 24, 1942.     A. H. STEWART ET AL     2,274,105
METHOD OF MANUFACTURING ARTICLES
Filed Oct. 12, 1938

INVENTORS

Patented Feb. 24, 1942

2,274,105

UNITED STATES PATENT OFFICE 2,274,105

METHOD OF MANUFACTURING ARTICLES

Andrew H. Stewart, Shields, and Peter Kucera, Allison Park, Pa.

Application October 12, 1938, Serial No. 234,550

4 Claims. (Cl. 49—85)

This invention relates to the manufacture of articles at elevated temperatures from material which is plastic at such temperatures and which contracts in volume upon cooling or setting. More particularly, it relates to the manufacture of molded glass articles including those having optical properties, such, for example, as reflector signals, reflector buttons and the like, frequently used in connection with highway signals, signs or markers.

In molding glass articles, for example, the pressing or molding operation is usually carried out at a temperature approximately from 1900° to 2100° F. in an iron mold having the desired contour and design. A metal plunger presses the plastic material into the exact shape of the mold. During the pressing operation the surface of the glass is cooled rapidly by conduction through the iron mold and plunger so that after a relatively short pressing period the plunger can be withdrawn and the glass article having a chilled and consequently rigid surface can be removed from the mold, but the interior of the article may still be at such a temperature as to be in soft, plastic condition. During cooling, the contraction of the glass body incident thereto tends either to form bubbles within the interior of the glass body, or else to produce distortion of the glass surface, unless the article is very carefully annealed. As a result, in the manufacture of articles requiring accurately formed surfaces, such, for example, as articles having some optical purpose, the size which can be successfully molded without requiring reshaping or grinding of the surfaces is limited.

An object of this invention is to provide an improved method of molding articles of glass or similar material in which contraction of the mass is so compensated for as to substantially prevent resulting distortion of the principal surfaces.

A further object is to provide a method of the type set forth in which surface distortion is confined to a prescribed area.

Figure 1:
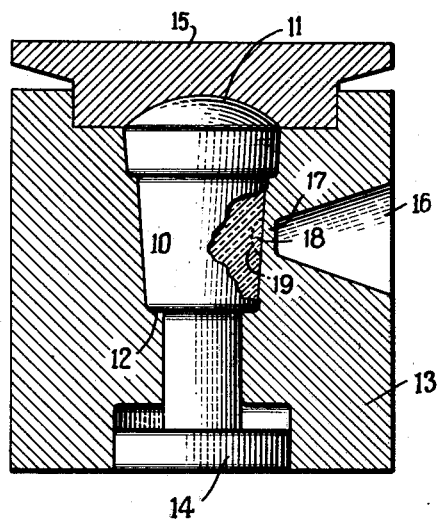
Figure 2:
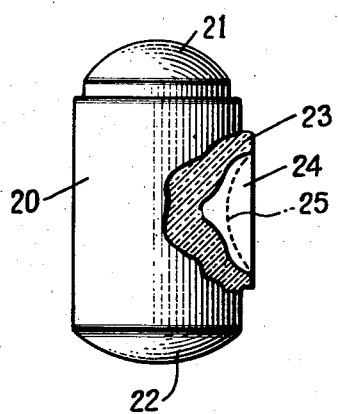
Figure 3:
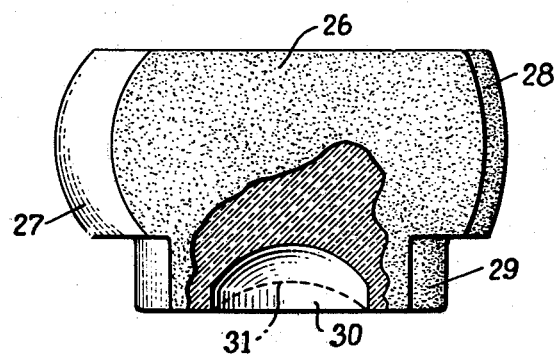

These and other objects which will be apparent to those skilled in the art are accomplished by the present invention, one embodiment of which is hereafter described in connection with the accompanying drawing in which, Fig. 1 is a sectional view of a mold showing a pressing operation as used in carrying out one embodiment of this invention, and Figs. 2 and 3 are partial sectional views of articles manufactured in accordance with this invention, although it will be apparent that the invention is not limited to the manufacture of the articles illustrated.

In carrying out the present invention, a semi-plastic glass blank is produced by a molding operation so controlled that a selected portion of the surface of the blank being formed is protected against such cooling by contact with the mold surface as would produce a permanently set or rigid shell, but the temperature of the selected area is maintained sufficiently high so that when the blank is removed from the mold this area will still be relatively soft or plastic. As a result, subsequent contraction of the glass body due, for example, to cooling, is compensated for by material from the selected area. This satisfies the strains due to contraction of the inner body and relieves the remaining surfaces of the article from such strains as have heretofore produced either distortion of such surfaces or the formation of bubbles within the body. As a result, articles which require accurately shaped surfaces can be easily and cheaply manufactured by conventional molding operations and no subsequent grinding or reshaping of such surfaces will be necessary.

The step of maintaining a predetermined surface area of the blank being shaped at sufficient temperature to prevent undue chilling thereof can be accomplished in various ways. One way of so doing is shown in Fig. 1 which illustrates the method applied to the manufacture of a conventional type of reflector button 10 having the usual lens surface 11 and cooperating surface 12 which is subsequently treated to form an internal mirror face. Such surfaces obviously must be accurately shaped for efficient operation. In the present invention a button can be formed in a mold 13 having the usual ejector 14 and plunger 15.

As illustrated, the mold is provided with a cavity 16 which is so formed as to reduce the thickness of the mold wall, at a predetermined point 17 in the side thereof, sufficiently to reduce the chilling effect of the metal on the area 18 of the blank so that such area is still substantially plastic when the blank is removed from the mold after the pressing operation. As a result, a contraction compensating area of relatively soft glass is provided at a predetermined point in the side wall of the button 10. Hence, shrinkage strains of the still molten glass within the interior of the button, due to cooling, are satisfied by the glass from this area with the result that a slight indentation as indicated diagrammatically by the dotted line 19 in Fig. 1 will be formed, but the remaining surfaces of the blank, particularly the optically effective faces 11 and 12 which were sufficiently chilled by the pressing operation to resist the strains of interior cooling, having been relieved of such strains by the compensating area 18, have been protected against distortion.

Fig. 2 illustrates another form of a reflector signal which the present invention permits being made in considerably larger sizes than has heretofore been possible by an ordinary molding operation. This button 20 has a lens face 21 and cooperating face 22 which ultimately forms the reflector. This button has a slight extension 23 formed around the contraction compensation area which is located substantially outside the optically effective area of the article itself. In this form of device the mold plunger itself forms a slight cavity 24, comprising the contraction compensation area extending into the blank approximately to the extent indicated by the dotted line 25. The area is maintained sufficiently soft for the purposes of this invention, by withdrawing the plunger before the surface of the area with which it is in contact has been too chilled by such contact. The blank is left in the mold long enough to provide the desired chilling for the other surfaces including the optically effective surfaces 21 and 22. Thereafter, upon removal from the mold, contraction of the interior body is compensated for by material from the relatively soft compensating area 24 in the manner above described.

Fig. 3 shows a still further form of reflector signal 26 which is easily and cheaply manufactured by the present invention. The operation here is similar to that described in connection with the form of button shown in Fig. 2. The lens face 27 and mirror face 28 are formed on opposite sides of the article and an extension 29 within which is located the cavity 30 forming the contraction compensation area. The mold plunger originally forms the cavity to approximately the extent indicated by the dotted line 31 but is withdrawn while the surface of this area is still soft, with the result that the subsequent molding of the article and contraction of the glass body is compensated for by drawing glass from the area 30 with the result that the cavity is enlarged to the extent approximately indicated in the drawing.

It should be understood that the plasticity of the contraction compensating area is aided after the blank is withdrawn from the mold by the reheating effect upon such area of the still molten glass within the interior of the body portion. In other words, some reheating effect occurs through heat passing from the interior of the body portion to the area in question and, inasmuch as this area has not been chilled to the extent of the remaining surface area of the blank, it becomes somewhat more plastic after removal from the mold and this in turn aids the functioning of the area.

Although we have described the invention particularly with reference to the manufacture of glass articles, it will be readily understood that the invention is equally well adapted to the manufacture of articles from other materials of the same general characteristics. Obviously, the invention can be variously modified and adapted within the scope of the appended claims.

We claim:

1. The method of controlling the cooling and shrinkage of molded glass articles having spaced optical surfaces of predetermined shape and contour to prevent distortion of said surfaces, which comprises subjecting all surfaces of a semi-plastic glass blank to pressure in a mold having spaced surfaces of predetermined contour conforming to the desired contour of said optical surfaces and simultaneously forming a chilled skin of predetermined contour on said optical surfaces, simultaneously shaping and chilling the remaining surfaces of said blank intermediate the optical surfaces by contact with the metal of the mold to provide a chilled skin of desired viscosity thereon, maintaining a portion of the surface of said blank intermediate said optical surfaces at a substantially higher temperature, thereby to form a surface of less viscosity in a localized area of said blank intermediate said optical surfaces, thereafter removing the blank from the mold and cooling the blank so that contraction of the glass within the body of the blank will be compensated by hotter glass in the localized area of lower viscosity surface.

2. The method of controlling the cooling and shrinkage of molded glass articles having spaced optical surfaces of predetermined shape and contour to prevent distortion of said surfaces, which comprises subjecting all surfaces of a semi-plastic glass blank to pressure in a mold having spaced surfaces of predetermined contour conforming to the desired contour of said optical surfaces, and simultaneously forming a chilled skin of predetermined contour on said optical surfaces, simultaneously shaping and chilling a substantial portion of the remaining surfaces of said blank intermediate said optical surfaces, controlling the chilling action of the mold on the glass in a localized area intermediate said optical surfaces at a lower rate than in the remaining surfaces of said mold to form a chilled skin on said optical surfaces and a substantial portion of the remaining surfaces of said blank of greater viscosity than at said localized area intermediate said optical surfaces, removing the blank from the mold, and cooling the blank to permit contraction of the glass within the body of the article to be compensated by the hotter glass from said localized area.

3. The method of controlling the cooling and shrinkage of molded glass articles having spaced optical surfaces of predetermined shape and contour to prevent distortion of said surfaces, which comprises subjecting all surfaces of a semi-plastic glass blank to pressure in a mold having spaced surfaces of predetermined contour conforming to the desired contour of said optical surfaces, and simultaneously forming a chilled skin of predetermined contour on said optical surfaces, simultaneously shaping and chilling a substantial portion of the remaining surfaces of said blank intermediate said optical surfaces by contact with the metal of the mold, simultaneously forming a cavity of predetermined size in said molded blank intermediate said optical surfaces, controlling the chilling action of the mold on the glass in the region of said cavity at a lower rate than throughout the remaining surfaces of said blank to form a chilled skin on said optical surfaces and the major portion of the intermediate surfaces of said blank of greater viscosity than in the region of said cavity, removing the blank from the mold and thereafter cooling the blank to permit contraction of the glass within the body of the blank to be compensated by the hotter glass in the region of said cavity.

4. In the manufacture of solid molded glass articles having spaced optical surfaces of molded predetermined contour conforming to the optical surfaces of the finished article, the step of molding a semi-plastic pressed glass blank to shape and chill the spaced optical and the intermediate surfaces to a size and shape substantially conforming to the size and shape of the finished article, the outer surface of said blank having a highly chilled skin on the spaced optical surfaces and major portion of the intermediate surfaces, and a lightly chilled skin of less viscous glass in a localized area intermediate said optical surfaces, and thereafter cooling the blank while unconfined in a mold so that the contraction of the glass of said article between its optical surfaces is compensated by the less viscous glass drawn from said localized area.

ANDREW H. STEWART.
PETER KUCERA.